(12) United States Patent
Inoue et al.

(10) Patent No.: US 7,082,791 B2
(45) Date of Patent: Aug. 1, 2006

(54) APPARATUS FOR FABRICATING SOOT PREFORM FOR OPTICAL FIBER

(75) Inventors: Dai Inoue, Annaka (JP); Go Ogino, Annaka (JP); Tetsuya Otosaka, Annaka (JP); Tadakatsu Shimada, Annaka (JP); Hideo Hirasawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/698,657

(22) Filed: Oct. 31, 2003

(65) Prior Publication Data

US 2005/0210925 A1    Sep. 29, 2005

Related U.S. Application Data

(62) Division of application No. 09/974,929, filed on Oct. 10, 2001.

(30) Foreign Application Priority Data

Oct. 18, 2000   (JP) .............................. 2000-317555

(51) Int. Cl.
*C03B 37/018*    (2006.01)

(52) U.S. Cl. ............................ 65/413; 65/502; 65/382; 65/391; 65/14.7; 65/414; 65/415; 65/531

(58) Field of Classification Search .................. 65/413, 65/502, 385, 391, 17.4, 414, 415, 531, 532
See application file for complete search history.

(56) References Cited

U.S. PATENT DOCUMENTS 6,012,305 A * 1/2000 Kuwabara et al. ............ 65/502

* cited by examiner

*Primary Examiner*—Mark Halpern
(74) *Attorney, Agent, or Firm*—J.C. Patents

(57) ABSTRACT

An apparatus for fabricating a soot preform for an optical fiber. The soot preform is fabricated by depositing glass particles on a starting rod capable of being rotated and pulled up. The apparatus comprises elements as follows. A reaction chamber is used for depositing the glass particles on the starting rod. An upper room is located above the reaction chamber for receiving the soot preform formed in the upper portion of the reaction chamber. At least one core burner is installed in the reaction chamber. A gas-supplying inlet is located in the top part of the sidewall of the reaction chamber closest to burner(s), and a gas-exhausting outlet is located in the top part of another sidewall opposite to the gas-supplying inlet. In addition, at least one cladding burner is installed in the reaction chamber. Thus, the exhausting efficiency for the stray glass particles is increased and the bubbles and impurities in the resulting preform are reduced such that the optical property in the lengthwise direction is stable.

5 Claims, 6 Drawing Sheets

APPARATUS FOR FABRICATING SOOT PREFORM FOR OPTICAL FIBER

CROSS-REFERENCE TO RELATED APPLICATION

This application is a divisional application of, and claims the priority benefit of, U.S. application Ser. No 09/974,929 filed on Oct. 10, 2001

BACKGROUND OF THE INVENTION

1. Field of the Invention

This invention relates in general to an apparatus for fabricating a soot preform for an optical fiber, and more specifically relates to an apparatus for stably fabricating a high-quality soot preform for an optical fiber by vapor-phase axial deposition.

2. Description of Related Art

Vapor-phase axial deposition (VAD) is a well-known process for fabricating a fiber preform nowadays. A starting rod is installed on a shaft capable of being rotated and shifted vertically into and out of a reaction chamber. Glass particles generated by a core burner and a cladding burner in the reaction chamber are deposited on the front end of the starting rod, thereby a porous soot preform (soot preform, hereinafter) consisting of a core and a cladding layer for an optical fiber is fabricated.

In general, the deposition efficiency for depositing the glass particles on the starting rod is not 100%, a lot of stray glass particles, which are not adhered or deposited on the starting rod, occur during the fabrication. Most of the stray glass particles are exhausted from an exhausting pipe of the reaction chamber along with other gases that should be exhausted. However, a portion of the stray glass particles are adhered to a ceiling and sidewalls of the reaction chamber during exhaustion of stray glass particles and other gases.

In general, the glass particles are generated by injecting chlorides serving as a source gas (such as $SiCl_4$) into an oxyhydrogen flame to thereby effect a flame hydrolysis process. The gases, such as water vapor and hydrochloric acid that are generated in this process and ought to be exhausted as well as the stray glass particles, which are not adhered and accumulated on the starting rod, are at high temperatures and tend to enter an upper room assembled on top of the reaction chamber.

Because the temperature of the upper room is not as high as the temperature of the reaction chamber, water vapor entering the upper room is condensed on the inner wall of the upper room and the hydrochloric acid is absorbed by it. Therefore, the upper room is eroded if the upper room is made of metals. Even if the upper room is made of erosion-resistant materials, the apparatus is difficult to clean up after the preform fabricating process is finished. Furthermore, the stray glass particles adhere to the hydrochloric acid-wet inner walls of the reaction room, resulting in that the apparatus is still more difficult to clean up.

Additionally, the stray glass particles, which first failed to adhere on the preform but later deposit on the surface of an off-the-frame portion of the preform, grow finely on the soot preform like trees. Then, in the subsequent glassification process, the tree-like protrusions are formed on the surface of the soot preform, causing difficulty in measuring the distribution of refraction index.

In general, for avoiding foregoing issues, a downward gas flow from the top of the upper room to the reaction chamber is used, thereby preventing the stray glass particles from adhering and accumulating on the walls of the upper room to a degree, but cannot this could not prevent the particles from adhering and accumulating to the ceiling and the walls of the reaction chamber.

In the conventional methods, in the post stage of the fabrication of the soot preform, flakes of the glass particles adhered or accumulated on the inner walls of the reaction chamber get detached from the walls and fell, stirring up the glass particles, some of which fell on the soot preform, causing that bubbles and impurities are formed in the glassified soot preform.

Recently, because the fiber demand is increased and its cost is requested to be reduced, it is very important to enlarge the optical fiber preform. Naturally, material supply must be increased for enlarging the fiber preform. Once the material supply is increased, the amount of the stray glass particles increase even if the deposition efficiency does not changed. Therefore, in the conventional methods, the frequency of the falling in masses of the stray glass particles from the inner walls of the reaction chamber increased.

In order to enhance the exhausting efficiency of the stray glass particles, a method was proposed to increase the gas-supplying amount and the gas-exhausting amount. However, this method causes the gas flow in the reaction chamber to be more turbulent, and the flame of the core burner, whose gas flow rate is relative low, is seriously disturbed. As a result, the distribution of refraction index of the soot preform in the length-wise direction becomes uneven.

Furthermore, if the radius of the soot preform is large, the gap between the soot preform and the wall of the upper room changes drastically as the soot preform is gradually moved into the upper room, especially which the tapered top of the preform passes the boundary between the upper room and the reaction chamber. Therefore, at the boundary between the reaction chamber and the upper room, i.e., the entrance of the reaction chamber, the gas flow from the upper room to the reaction chamber is very fast after the trunk of the soot preform is moved into the upper room.

The gas flow, adjusted as of the beginning of the fabrication to properly prevent the gases and the stray glass particles from entering the upper room, becomes so strong when the preform starts entering the upper room that it disturbs the core deposition.

For solving the foregoing problems, Japanese Laid Open 9-118537 and 11-343135 provide apparatuses capable of effectively exhausting the stray glass particles that are not properly deposited on the soot preform.

According to Japanese Laid Open 11-343135, it comprises two reaction chambers: one is for depositing core and the other is for depositing cladding. Each of the reaction chambers is equipped with an exhausting damper capable of adjusting exhausting pressure respectively. The exhausting pressure for the separated cladding reaction chamber is set higher than that used in the conventional reaction chamber so that even when the exhausting amount from the cladding reaction chamber is increased, the flame for depositing the core is not disturbed. Therefore, the soot preform can be fabricated stably.

However, because the reaction chamber is divided into two separated reaction chambers, the control of the exhausting pressure for each reaction chamber becomes difficult. In addition, the glass particles generated during the core deposition tend to accumulate on the lower side face of the partition, leading to the same drawbacks described above.

According to Japanese Laid Open 11-343135, gas is introduced through a whole sidewall behind a burner in the reaction chamber and a gas-exhausting outlet is installed in a sidewall opposite to the sidewall through which the gas is introduced. Furthermore, a flow-guide wall having numerous gas blowout holes is provided to each of the two sidewalls, between which the soot preform poses, thereby the amount of the glass particles adhered or accumulated on the inner walls of the reaction chamber is reduced.

However in an apparatus as this, the gas flow around the core burner becomes faster and more turbulent, thereby the core deposition is disturbed and an even distribution of refraction index in the lengthwise direction cannot be obtained.

In addition, according to FIG. 1 of Japanese Laid Open 11-343135, for preventing the air from entering the upper room through gaps between an upper cap and a driving shaft, a seal gas is introduced into the upper room from its top. However, it could not efficiently prevent the exhausting gases and the stray glass particles from entering the upper room.

SUMMARY OF THE INVENTION

According to the foregoing description, an object of this invention is to provide an apparatus for fabricating a soot preform for an optical fiber by the VAD process. The apparatus can increase an exhausting efficiency of the stray glass particles and reduce bubbles and impurities in the resulting preform. Accordingly, using the apparatus, a soot preform for an optical fiber having stable optical characteristics along the lengthwise of the soot preform is obtained.

According to the object mentioned above, the invention provides an apparatus for fabricating a soot preform for an optical fiber. A soot preform is fabricated by depositing glass particles on a starting rod capable of being rotated and pulled up, wherein the glass particles are generated from source gasses by a flame hydrolysis reaction. The apparatus comprises subject elements as follows. A reaction chamber is used for depositing the glass particles on the starting rod by the flame hydrolysis reaction. An upper room is located above the reaction chamber for housing the pulled up soot preform formed in the reaction chamber by deposition. At least one core burner is installed in the reaction chamber. A gas-supplying inlet in the form of a horizontal slit is made in that sidewall of the reaction chamber which is nearest the burner(s), in the vicinities of the ceiling of the reaction chamber, and a gas-exhausting outlet is located at another sidewall of the reaction chamber opposite to the gas-supplying inlet. In addition, at least one cladding burner is installed in the reaction chamber.

According to preferred embodiments of the invention, the length of the gas-supplying inlet is at least 75% of the width of that sidewall of the reaction chamber in which it is made. And, the gas-exhausting outlet is substantially rectangular, and the distance between a top end of the gas-exhausting outlet and the ceiling of the reaction chamber is within 50 mm. The horizontal length of the gas-exhausting outlet is at least 75% of the width of that sidewall of the reaction chamber in which it is made. In the apparatus of claim 1, a gas-supplying flow velocity at the gas-supplying inlet is preferably between 3 m/sec and 20 n/sec. In the apparatus of claim 1, the supply of air from the gas-supplying inlet is effected by a pressure difference across the gas-supplying inlet, and the air passing through the gas-supplying inlet is prepared air.

The prepared air means an external air passed through a filter, or air in a clean room of class 10000 or better. Additionally, the upper room is substantially cylindrical, and it is preferred to use a gas flow descending from the upper part of the upper room to the reaction chamber, and a velocity of the gas flow from the top of the upper room down into the reaction chamber is preferably above 0.05 m/sec at the lower end of the upper room.

Moreover, a raised bottom portion higher than the core deposition level is formed in a bottom of the reaction chamber adjacent that sidewall having the gas-exhausting outlet, whereby the core deposition becomes more stable. The reaction chamber is divided by a horizontal partition into a lower reaction chamber and an upper reaction chamber, the latter having the gas-supplying inlet and the gas-exhausting outlet, and a connect hole is formed in the partition for communicating the upper and lower reaction chambers with each other. There are no gas-exhausting outlets formed in the lower reaction chamber except the connect hole for connecting the lower and the upper reaction chambers.

The connect hole is substantially circular concentric with a rotary shaft and having a radius about 50 mm greater than that of the part of the soot preform passing the hole, or alternatively the connect hole consists of a half of this circle as cut parallel to the wall having the gas-supplying inlet and a rectangle whose one side is the chord of said half circle, its subtend lying in that sidewall having the gas-supply inlet, wherein the connect hole is apart from sidewalls by at least 50 mm except the sidewall having the gas-supplying inlet.

The apparatus further comprises a core burner in the lower reaction chamber and a cladding burner in the upper reaction chamber. In addition, a core-heating burner can be further installed in the lower reaction chamber. Alternatively, in addition to the core burner, a cladding burner can be installed in the lower reaction chamber capable of performing a function of a core heating burner as well, wherein a cladding deposition by this additional cladding burner is essentially performed in the upper reaction chamber. Furthermore, instead of one core burner, a first core burner for depositing a center core and a second core burner for depositing a side core may be provided.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The apparatus for fabricating a soot preform for an optical fiber is described in detail as follows with reference to the drawings.

Figure 1:
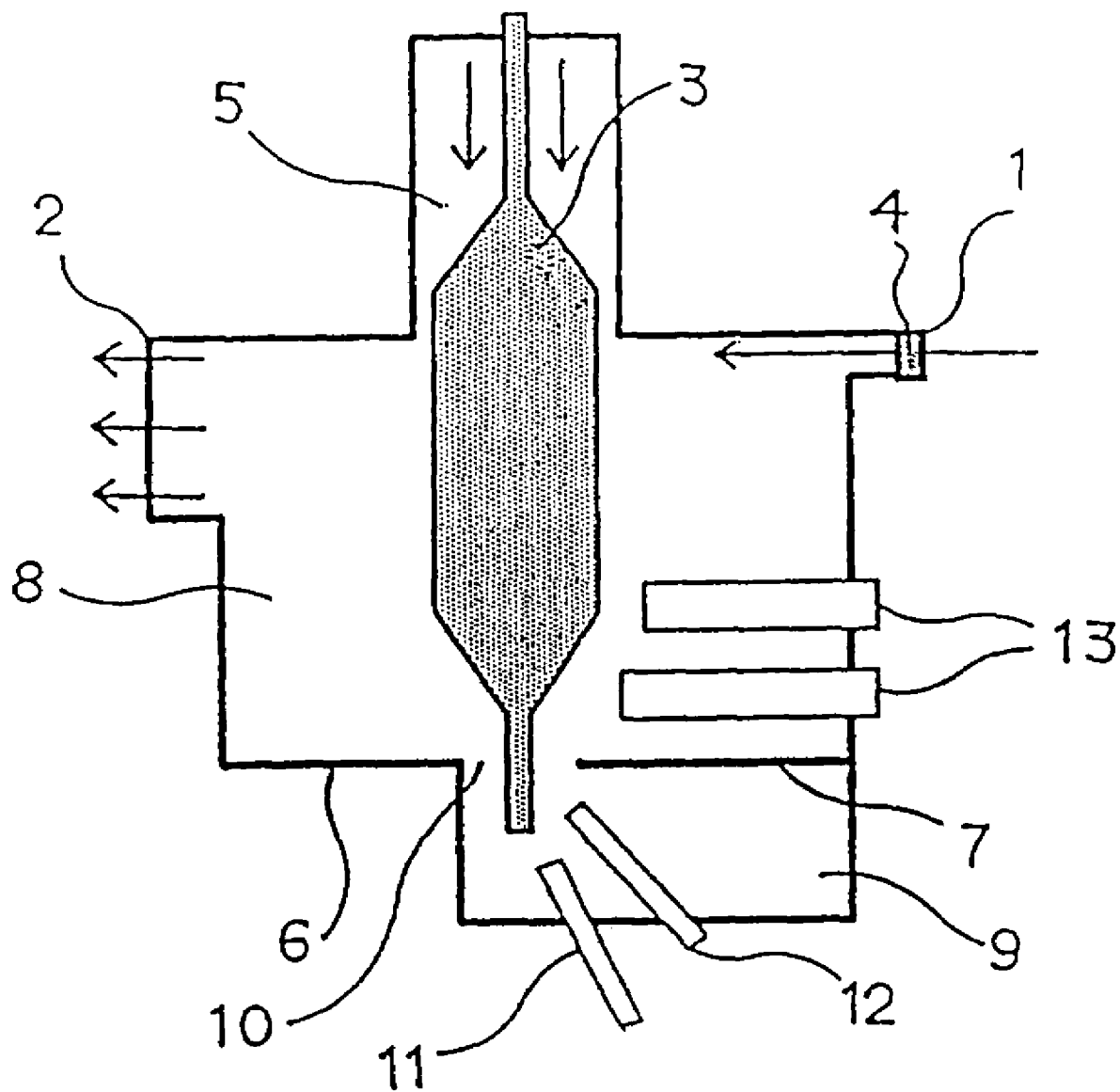
FIG. 1 schematically illustrates a cross-sectional view of the apparatus according to the first embodiment of the invention.
Figure 2:
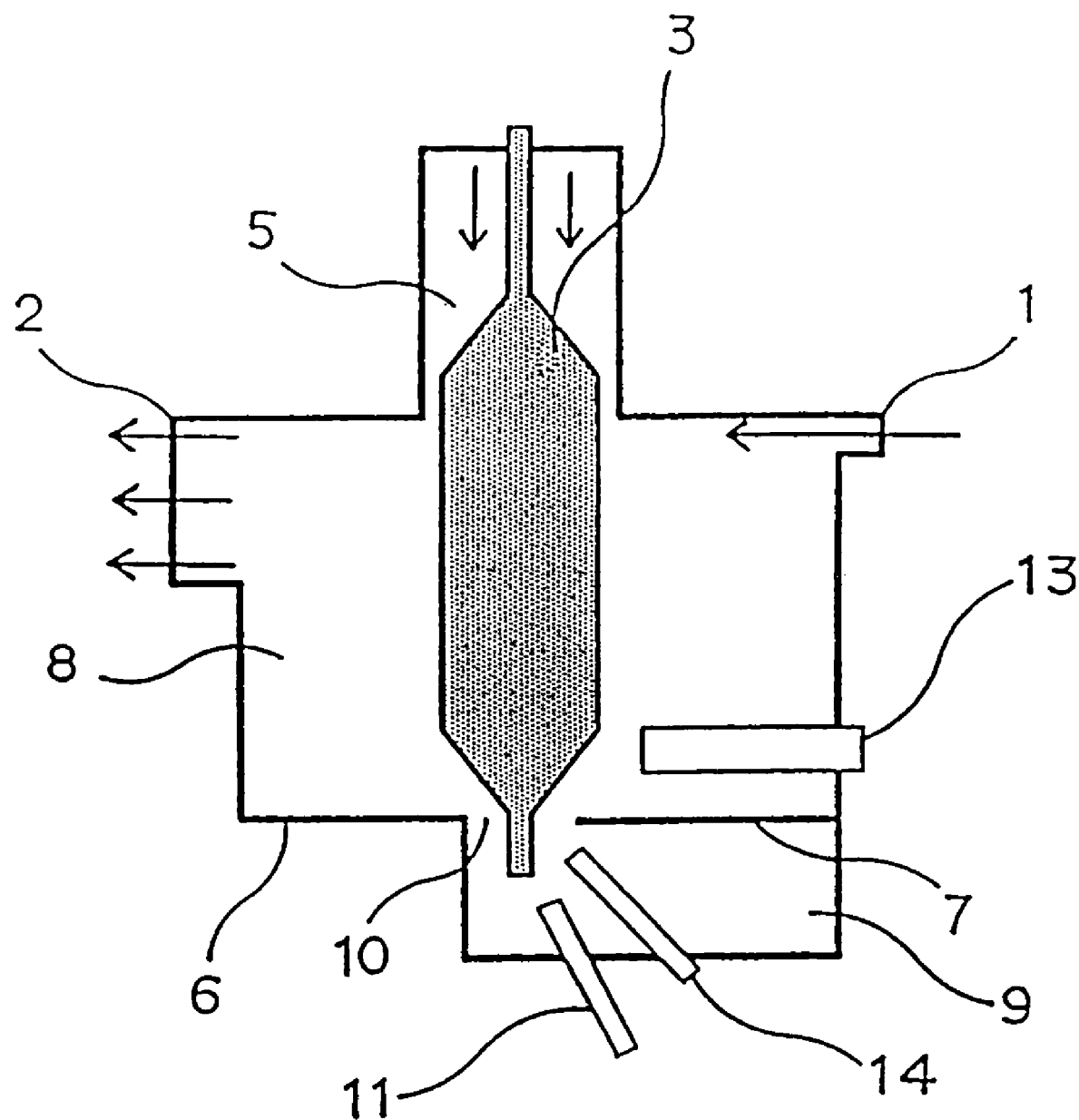
FIG. 2 schematically illustrates a cross-sectional view of the apparatus according to the second embodiment of the invention.
Figure 3:
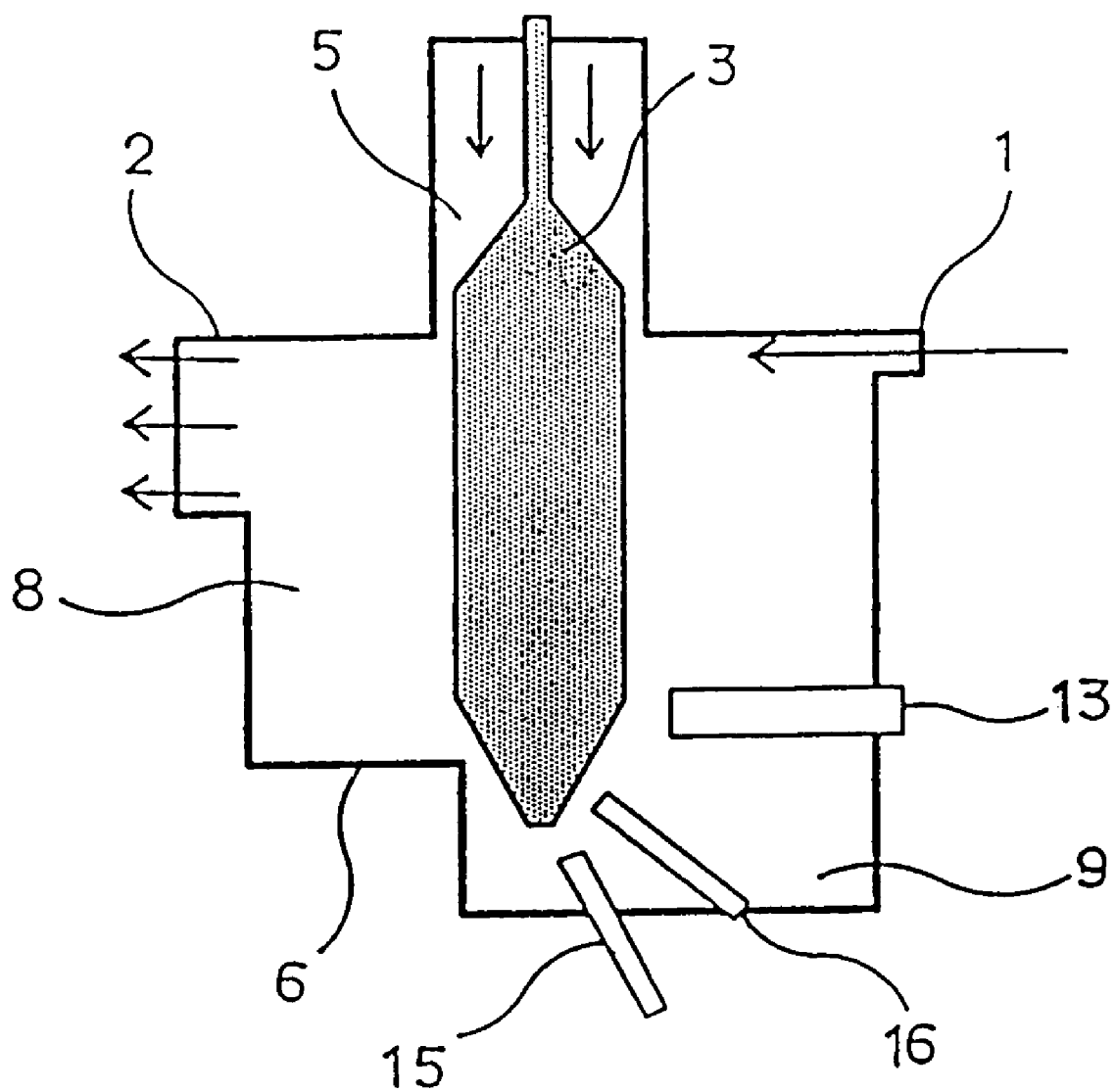
FIG. 3 schematically illustrates a cross-sectional view of the apparatus according to the third embodiment of the invention.
Figure 4:
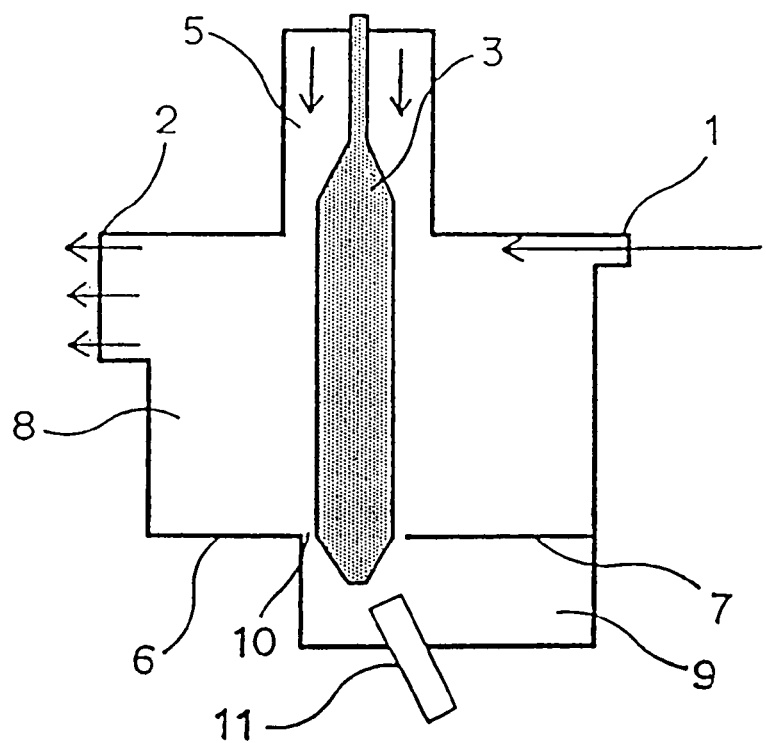
FIG. 4 schematically illustrates a cross-sectional view of the apparatus according to the fourth embodiment of the invention.
Figure 5:
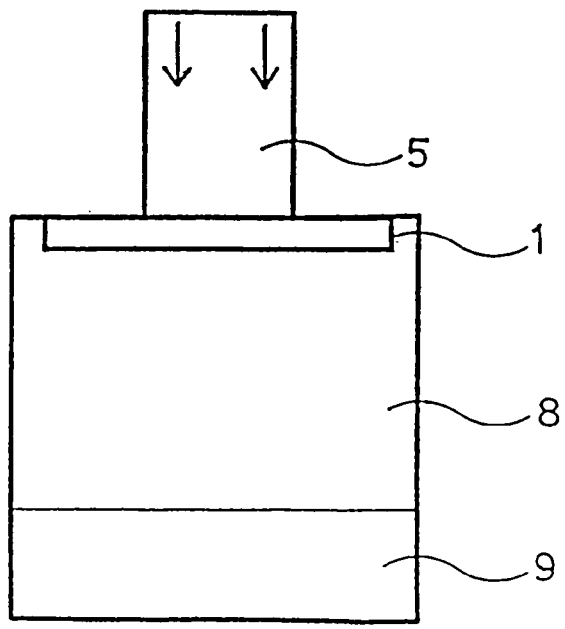
FIG. 5 shows a side view of a sidewall having a gas-supplying inlet thereon.
Figure 6:
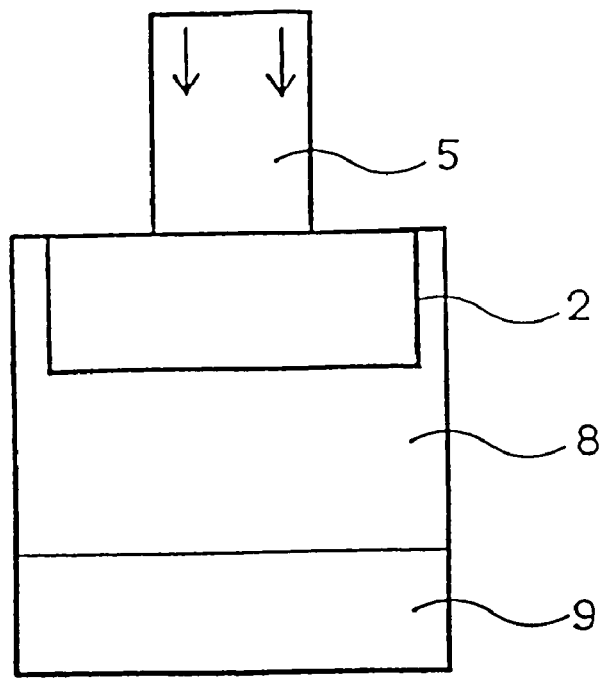
FIG. 6 shows a side view of another sidewall having a gas-exhausting outlet thereon.
Figures 7A, 7B:
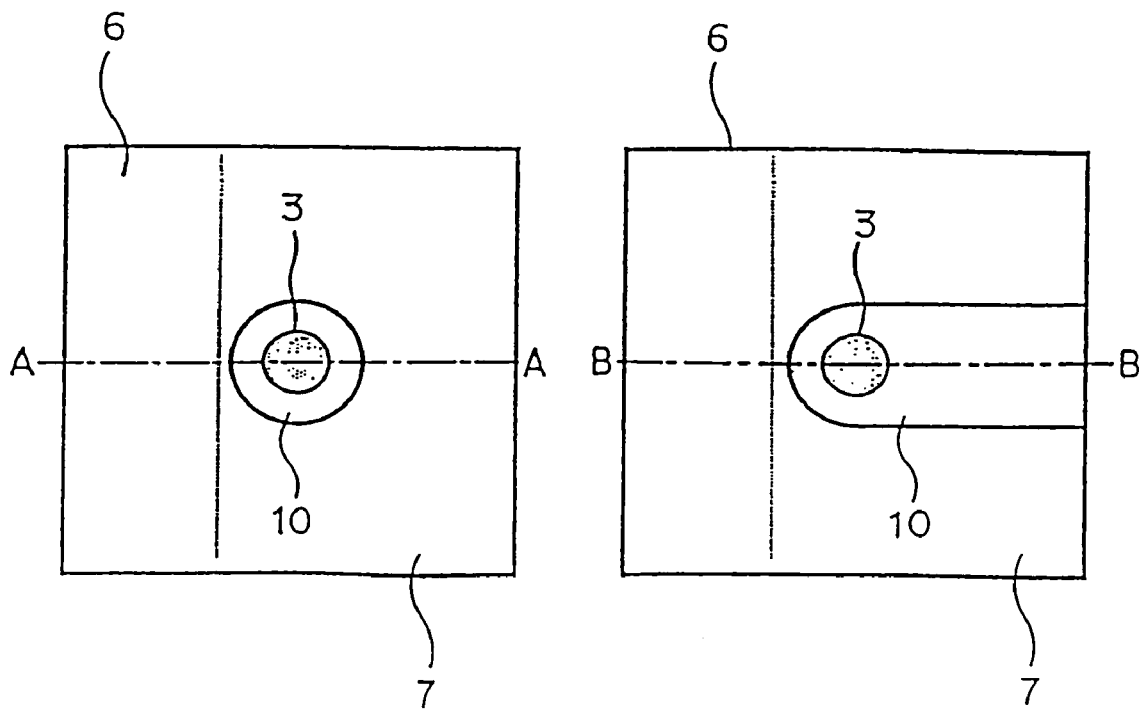
FIGS. 7A and 7B show different examples for a connect hole formed in a bottom of an upper reaction chamber of the apparatus.
Figure 8:
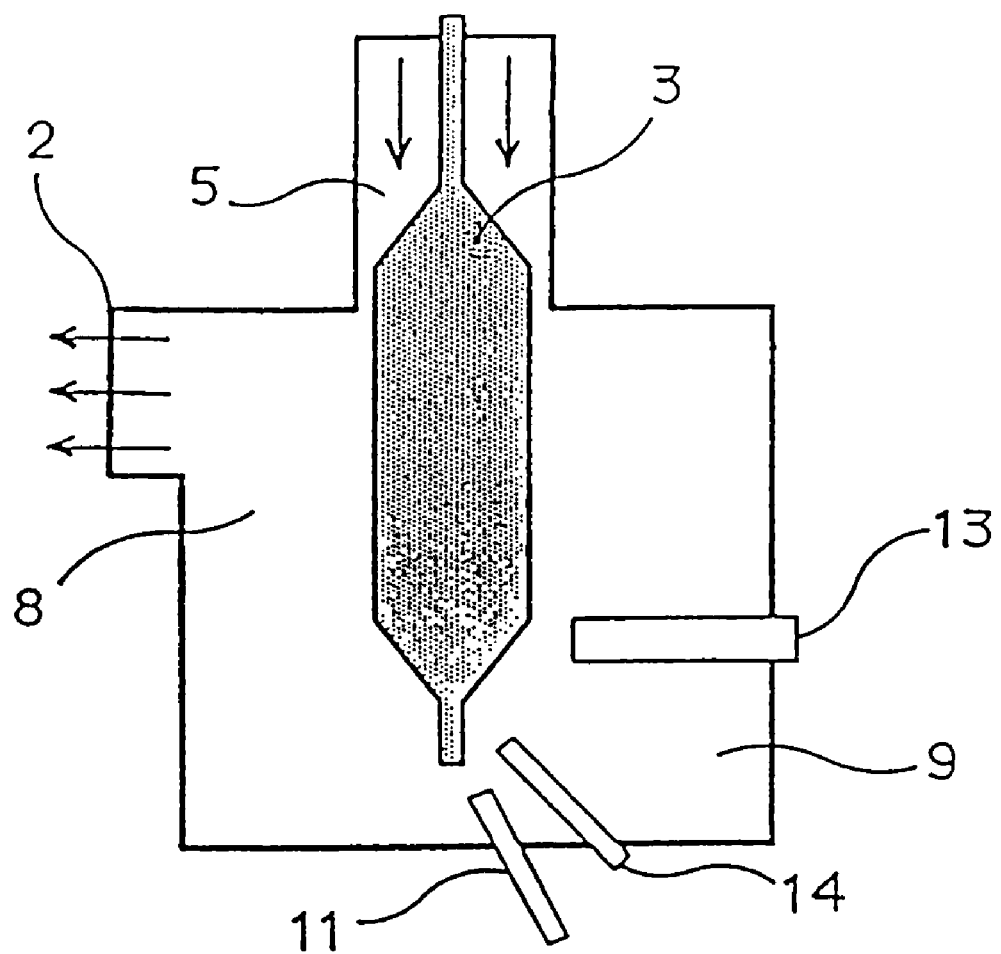
FIG. 8 shows a cross-sectional view of a conventional apparatus without a separating wall for dividing the reaction chamber into an upper and a lower reaction chambers and a raised bottom portion of the invention.

FIGS. 1~4 schematically illustrate front cross-sectional views of the apparatus for fabricating the optical fiber preform according to embodiments of the invention. FIGS. 5 and 6 schematically illustrate side views of the apparatus, in which FIG. 5 shows a sidewall having burners formed nearby and FIG. 6 shows another sidewall opposite to the sidewall in FIG. 5. In addition, FIGS. 7A and 7B show different examples for a connect hole formed in a bottom of an upper reaction chamber of the apparatus. Furthermore, FIGS. 1, 2 and 4 show cross-sectional views along a line A—A in FIG. 7A, and FIG. 3 shows a cross-sectional view along a line B—B in FIG. 7B. FIG. 8 shows a cross-sectional view of a conventional apparatus without a separating wall for dividing the reaction chamber into an upper and a lower reaction chambers and a raised bottom portion of the invention.

As shown in FIGS. 1~4, the apparatus of the invention comprises a gas-supplying inlet 1 and a gas-exhausting outlet 2. The gas-supplying inlet 1, in a slit shape, is installed near a ceiling of the reaction chamber and on a sidewall having burners formed nearby. The exhausting outlet 2 is installed on another sidewall opposite to the sidewall having the gas-supplying inlet 1 formed thereon. When a gas, such as the air, is introduced from the gas-supplying inlet 1 toward the exhausting outlet 2, a gas flow from the gas-supplying inlet 1 to the exhausting outlet 2 is formed near the ceiling of the reaction chamber.

Accordingly, among glass particles generated by flames of the burners, most of stray glass particles that do not form the soot preform 3 rise and are exhausted outside the reaction chamber by the gas flow above. Therefore it can significantly reduce the probability that the stray glass particles are adhered, and accumulated on the inner walls of the reaction chamber and then fall from the walls.

The greater the horizontal lengths of the gas-supplying inlet 1 and the gas-exhausting outlet 2, the better for forming a regular gas flow near the ceiling of the reaction chamber. Preferably, the horizontal lengths of the gas-supplying inlet 1 and the gas-exhausting outlet 2 are larger than 75% of the width of the reaction chamber. Similarly, like the gas-supplying inlet 1, it is preferable that the distance between a top end of the gas-exhausting outlet 2 and the ceiling of the reaction chamber within 50 mm.

Additionally, a preferred velocity at the gas-supplying inlet 1 is above 3 m/sec so that the stray glass particles can be efficiently exhausted from the reaction chamber by means of the gas flow near the ceiling of the reaction chamber. Because this gas flow directly hits upon the soot preform, the soot preform is vibrated if the gas-supplying velocity exceeds 20 m/sec. This vibration causes the distribution of the refraction index of the soot preform along its axis to be non-uniform. Therefore, it is better to restrict the gas-supplying velocity under 20 m/sec.

The gas introduced from the gas-supplying inlet 1 can be air, or gas having no influence on the reaction, for example an inert gas such as nitrogen ($N_2$), helium (He) and argon (Ar). Considering the cost, air is the best choice.

In an apparatus of this kind, the pressure of the reaction chamber is set to a negative pressure with respect to the external, thereby toxic gases, such as the hydrochloric acid, generated during the preform fabricating process do not leak from tiny gaps of the apparatus. For example, this can be done by installing an outward blower connected to the gas-exhausting outlet 2. As a result, the external air is caused to flow into the reaction chamber to form the gas flow.

Furthermore, the gas-supplying velocity can be adjusted to a desired value by means of properly setting the pressure difference between the external and the internal of the reaction chamber. However, tiny impurities also enter the reaction chamber along with air, and then adhere on the soot preform 3, causing the preform loss or impurities formed on the soot preform. For avoiding such issues, the supplied gas has to be prepared properly.

According to a preferred embodiment of the invention, for solving such problems, a dust-tight filter 4 is mounted on the gas-supplying inlet 1 for avoiding tiny impurities from flowing into the reaction chamber. For example, a commercial HEPA filter can be used for the dust-tight filter 4. Moreover, according to another preferred embodiment, the apparatus can be set in a proper clean room for reducing the impurities.

The formed soot preform 3 is gradually pulled up into an upper room 5, which is of a cylindrical shape for example. According to the conventional apparatus disclosed in Japan Laid Open 11-343135, a seal gas is introduced from the top part of the upper room. In this, the introduction of the seal gas into the upper room is for the purpose of preventing the atmospheric air from entering the reaction chamber, then is no need to vary the flow rate of the seal gas corresponding to the cross section of the upper room.

However, as the soot preform is scaled up, the diameter of the cylindrical upper room has to be enlarged. As a result, high-temperature gases generated in the reaction chamber and the stray glass particles enter the upper room carried by the updraft flow and then are cooled, and water vapor is condensed on the inner walls of the upper room. The generated hydrochloric acid is absorbed by the condensed water, causing it hard to clean upper room.

Therefore, the present invention increases the gas flow introduced from the top of the upper room 5 for avoiding the water vapor from condensing in the upper room. Namely, from the beginning of the fabricating process for the soot preform to the end, the velocity of the gas flow at the bottom of the upper room 5 is maintained above 0.05 m/sec for avoiding the foregoing issues. The velocity of this gas flow at the bottom of the upper room 5 is determined by the cross-sectional areas of the upper room 5 and of the soot preform 3 in the upper room 5.

According to the invention, unlike the conventional apparatus, the gas introduced from the top of the upper room 5 is not used for avoiding the atmospheric gas from entering the reaction chamber. The gas introduced from the top of the upper room 5 can be atmospheric air after being dried and compressed. Alternatively, gas having no influence on the reaction, for example, inert gases such as nitrogen ($N_2$), helium (He) or argon (Ar) can be also used. Considering the cost, air is the best choice.

According to the present invention, a relatively fast flow is formed in the upper part of the reaction chamber, flowing from the gas-supplying inlet 1 to the gas-exhausting outlet 2, and as a result, a circulating flow is generated underneath this one-way flow. This circulating flow can be a new cause for disturbing the core deposition. This circulating flow is created in the following manner: first a downward flow is formed falling along the wall underneath the gas-exhausting outlet 2, and then it turns and moves on the floor toward the wall having the gas-supplying inlet 1, and then the flow rises along this wall, and hence a circulatory flow is formed.

This flow on the floor directly collides with the flame of the core burner 11 whereby a stable deposition of core soot is prevented. In order to avoid this, a preferred embodiment of the invention forms a raised floor 6 on the gas exhaustion side at a level higher than the core deposition level, as shown in FIGS. 1–4. On account of this, the flow on the floor moves at a level higher than the core deposition level, so that this circulating flow will not interfere with the core deposition, and a stable deposition of core soot is possible.

However, the gas flow in the reaction chamber is not a stable flow. Sometimes, a strong downward gust along the sidewalls flanking the burners suddenly occurs, which disturbs the core deposition such that the distribution of the refraction index has local variations.

In order to avoid this, according to a more preferred embodiment of the invention, as shown in FIGS. 1, 2, and 4, a partition 7 is provided to divide the reaction chamber into an upper reaction chamber 8 and a lower reaction chamber 9, and a connect hole 10 is formed to communicate the two chambers 8, 9 with each other at a location where the core of the porous preform 3 is disposed; also the lower reaction chamber 9 is made to have essentially no outlet except this connect hole 10. The connect hole 10 shared by the reaction chambers 8, 9 has a cross section smaller than that of the upper reaction chamber 8, and this partition 7 effectively performs the same function as the raised floor 6 as well.

By adopting this construction, the circulatory flow and the sudden downward gusts along the walls will not reach the lower reaction chamber 9, whereby the lower reaction chamber 9 will have an essentially stagnant atmosphere so that the flame of the core deposition burner 11 will not be disturbed by the air flows.

The partition 7 dividing the two reaction chambers 8, 9 is so disposed that the core deposition level comes within the lower reaction chamber 9. The gases and the stray glass particles generated by the flames of the burners provided in the lower reaction chamber 9 flow into the upper reaction chamber 8 by way of the connect hole 10, and are exhausted from the gas exhaustion outlet 2.

According to a still more preferred embodiment of the invention, the position and the size of the connect hole 10 are specified. In order to bring about a stagnant atmosphere in the lower reaction chamber 9, the connect hole 10 must not be too large. Especially, if those gaps made around the soot preform 3 in the connect hole 10 on the sides of the exhaustion gas outlet port 2 and the sidewalls adjacent to the wall containing the exhaustion gas outlet port 2 are too wide, a satisfactory effect cannot be attained.

Preferred examples of the connect hole 10 are shown in FIG. 7A and FIG. 7B. FIG. 7A shows the bottom of the upper chamber 8 of FIGS. 1, 2 or 4, wherein the connect hole 10 is circular. This circular connect hole 10 is preferably of a radius about 50 mm greater than the radius of that part of the soot preform 3 passing this hole. The radius of the connect hole 10 can be the range of 45–55 mm greater than the radius of the passing preform.

FIG. 7B shows the horizontal bottom of the upper reaction chamber 8 of FIG. 3, and this connect hole 10 consists of the void of a semicircle cut in half from the above defined circle orthogonally to the line B—B and the void of a rectangle whose one side is the chord of this semicircle, its subtend lying in that sidewall having the gas-supplying inlet, wherein the connect hole 10 is distanced from the sidewalls by at least 50 mm except the side wall having the gas-supplying inlet, and is wide enough to make at-least-20 mm gap all around the soot preform.

By virtue of this construction, the downward flow is prevented from entering the lower reaction chamber 9, and the atmosphere in the lower reaction chamber is rendered stagnant, and, therefore, the flames of the core burners are not disturbed, and a good result is obtained.

On the contrary, if the connect hole 10 is too small, such that the gap formed around the soot preform 3, which is concentrically disposed through the connect hole 10, is narrower than 20 mm, then the gases and the stray glass particles generated by the flames of the burners provided at the lower reaction chamber tend to fail to flow into the upper reaction chamber, so that the stray glass particles adhere to and grow on the ceiling (the lower face of the partition 7) and the inner edge of the connect hole 10, and they may be detached and float until some of them fall on the soot preform to eventually become impurities and bubbles. Furthermore, if the connect hole 10 is too small, the upper reaction chamber 8 and the lower reaction chamber 9 are so much isolated from each other that there occurs difference in the pressure of the two chambers 8, 9 whereby a current of air is generated across the narrow gap of the connect hole, which disturbs the flames of the burners installed at the lower reaction chamber. Therefore, in a preferred embodiment of the invention, the gap around the starting rod in the connect hole 10 is 20 mm or greater.

The manufacturing apparatus of the invention which has been described hereinabove has a rectangular cross section when cut by a horizontal plane, but the invention is not restricted to this but may be an apparatus that has circular horizontal cross section or the like.

It is also possible to provide a gas-supplying inlet in the lower reaction chamber so long as it does not cause a disturbance in the flames of the core deposition burners. Incidentally, the soot preform thus made is, next, dehydrated and then heated to glassify to become an optical fiber preform; then the preform is elongated, if necessary, to have a diameter suitable for fiber drawing, and this elongated preform is eventually drawn to be an optical fiber. In some production process, the preform made by the method described above does not have enough cladding portion. In such case, the preform is elongated to proper size and is added cladding portion at the subsequent process, then drawn to be an optical fiber.

EMBODIMENTS

<<First Embodiment>>

The manufacture apparatus as shown in FIG. 1 is designed to manufacture porous soot preforms by VAD method, and it comprises: a reaction furnace including a cylindrical upper room 5 having a radius of 130 mm provided on top of a substantially cubic reaction chamber, which has sides of about 500 mm, and being so designed that the center of the ceiling of the reaction chamber is coincidental with the center line of the cylindrical upper room 5; and a rotary shaft (not shown), whose rotation axis is coincidental with the central axis of the upper room 5, and which is capable of freely moving vertically. As shown schematically in FIG. 1, a gas-supplying inlet 1, a slit of 480 mm in length and 15 mm in width, is made in a vertical wall having burners 13 equipped thereon, at a location 5 mm beneath a ceiling of the reaction chamber, and a gas-exhausting outlet 2, 480 mm in length and 200 mm in width, is made in a wall opposite the gas-supplying inlet 1, at a location 5 mm beneath the ceiling.

Also a partition 7 having a circular hole of a radius about 50 m greater than the radius of that part of the soot preform passing this hole is provided extending horizontally from the wall having the gas-supplying inlet 1, at a level 150 mm from the bottom of the reaction chamber, and this partition 7 divides the reaction chamber into an upper chamber 8 and a lower chamber 9. Further, a raised floor 6 is formed adjacent the wall having the gas-exhausting outlet 2 in the bottom of the reaction chamber, and this raised floor 6 is flush with the partition 7. One core deposition burner 11 and one core heating burner 12 are installed at the lower reaction chamber 9, and two clad deposition burners 13 are installed at the upper chamber 8.

The level at which the soot for core is deposited on one end of the starting rod or growing soot preform is set at 100 mm from the bottom of the lower reaction chamber 9. From the start till the end of the soot deposition operation, air at a rate of 300 l/min was introduced from the top of the upper room 5 to maintain a downward air current of 0.09 m/sec or higher. An HEPA filter as a dust-tight filter 4 is provided at the air-supplying inlet 1, whereby the external air supplied into the chamber 8 through the inlet 1 is freed from dusts that would result in impurities in the preform. During the operation, the gas drawing pressure at the gas-exhausting port was regulated such that the gas flow velocity at the gas-supplying inlet 1 is maintained at 5 m/sec.

The core deposition burner 11 was supplied with 450 ml/min of SiCl4 and 25 ml/min of GeCl4 as raw material gases. The two clad deposition burners 13 were supplied with SiCl4 as a raw material gas at the rates of 1.0 l/min and 2.5 l/min, respectively. All of the deposition burners as well as the core heating burner 12 were supplied with hydrogen H2 as the combustion gas and oxygen O2 as the oxidizing gas.

A soot preform for single mode optical fiber was made in the above-specified apparatus. The soot preform had an overall diameter of 200 mm and a core diameter of 40 mm, and the deposition rate was 450 g/hr. Throughout the manufacturing operation, the amounts of the stray glass particles that adhered and accumulated on the ceilings and the walls of the upper room 5 and the reaction chambers were reduced compared with the conventional method and the glass particles did not fall from their surfaces. The porous soot preform was glassified and then subjected to a measurement for refraction index distribution, and it was found that the distribution was uniform along the length of the preform and it had excellent optical properties.

<<Second Embodiment>>

In a second embodiment, an apparatus of FIG. 2 was placed inside a clean room of class 10000 and no dust-tight filter 4 was mounted across the gas-supplying inlet 1.

In regard to burners, installed at the lower reaction chamber 9 are one core deposition burner 11 and one clad deposition burner 14, which latter is disposed near the burner 11 and is substantially effective as a core heating burner too, and then one clad deposition burner 13 is installed at the upper reaction chamber 8. The position of the clad deposition burner 14 installed at the lower reaction chamber 9 was adjusted such that the deposition of the glass particles on the clad takes place inside the upper reaction chamber. Incidentally, the apparatus of FIG. 2 of the second embodiment is the same as that of the first embodiment shown in FIG. 1 except that the former lacks a dust-tight filter and has fewer burners, of which one is for both clad deposition and core heating.

Except that the core deposition burner 12 of FIG. 1 is absent in the second embodiment, the apparatus of FIG. 2 was operated under the same gas supply conditions as the first embodiment, to manufacture a soot preform for single mode optical fiber, and as a result a soot preform having an overall diameter of 200 mm and a core diameter of 40 was obtained. The deposition rate was 450 g/hr. Throughout the manufacturing operation, the amounts of the stray glass particles that adhered and accumulated on the ceilings and the walls of the upper room 5 and the reaction chambers were reduced compared with the conventional method and the glass particles did not fall from their surfaces. This porous soot preform was glassified and then subjected to a measurement for refraction index distribution, and it was found that the distribution was uniform along the length of the preform and it had excellent optical properties.

<<Third Embodiment>>

The apparatus shown in FIG. 3 was installed in a clean room of class 10000, and a dust-tight filter 4 of the first embodiment was not provided across an gas-supplying inlet 1 of this third embodiment. As schematically shown in FIG. 7B, the bottom of an upper reaction chamber 8 was shaped such that a connect hole 10 made in a horizontal partition 7 consists of the void of a semicircle of a radius of 100 mm, whose center substantially coincides with the rotating axis of a starting rod, and which is cut from a circle by a diameter orthogonal to a line B—B, and of the void of a rectangle whose one side is the chord of said semicircle, its subtend lying in that sidewall having the gas-supplying inlet 1. One center core deposition burner 15 and one side core deposition burner 16 were installed at a lower reaction chamber 9, and one clad deposition burner 13 was installed at an upper reaction chamber 8. Incidentally, the apparatus of FIG. 3 of this third embodiment is the same as that of the first embodiment shown in FIG. 1 except that the former lacks a dust-tight filter and has a connect hole of a different configuration and has fewer burners, of which one is for center core deposition and another for side core deposition.

The center core deposition burner 15 was supplied with 100 ml/min of SiCl4 and 35 ml/min of GeCl4 as raw material gases. The side core deposition burner 16 was supplied with 500 ml/min of SiCl4 and 60 ml/min of GeCl4 as raw material gases. The clad deposition burner 13 was supplied with 2.5 l/min of SiCl4 as a raw material gas. Further, each deposition burner was supplied with hydrogen H2 as the combustion gas and oxygen O2 as the oxidizing gas.

A soot preform for dispersion shifted single mode optical fiber was made in the above-specified apparatus. This soot preform had an overall diameter of 180 mm, and an outer diameter of a side core measured at the connect hole was 120 mm, and the deposition rate was 300 g/hr. Throughout the manufacturing operation, the amounts of the stray glass particles that adhered and accumulated on the ceilings and the walls of the upper room 5 and the reaction chambers were reduced compared with the conventional method and the glass particles did not fall from their surfaces. The porous soot preform was glassified and then subjected to a measurement for refraction index distribution, and it was found that the distribution was uniform along the length of the preform and it had excellent optical properties.

<<Fourth Embodiment>>

An apparatus of this fourth embodiment shown in FIG. 4 is the same as that of the second embodiment shown in FIG. 2 except that the former has a connect hole of a different configuration and has only one burner.

The connect hole 10 of a horizontal partition 7 was made in a shape of a circle of a radius of 100 mm whose center coincides with the rotation axis of the starting rod. One core deposition burner 11 was installed at a lower reaction chamber 9 and no burner was provided at an upper reaction chamber. The core deposition burner 11 was supplied with 1.6 l/min of SiCl4 and 150 ml/min of GeCl4 as raw material gases, and also with hydrogen H2 as the combustion gas and O2 as the oxidizing gas.

A soot preform for multimode optical fiber was made in the above-specified apparatus, and the soot preform had an overall diameter of 140 mm, and the deposition rate was 140 g/hr. Throughout the manufacturing operation, the amounts of the stray glass particles that adhered and accumulated on the ceilings and the walls of the upper room 5 and the reaction chambers were reduced compared with the conventional method and the glass particles did not fall from their surfaces. The porous soot preform was glassified and then subjected to a measurement for refraction index distribution, and it was found that the distribution was uniform along the length of the preform and it had excellent optical properties.

<<Comparative Embodiment>>

An apparatus of this comparative embodiment shown in FIG. 8 is the same as that of the second embodiment shown in FIG. 2 except that the former does not have a gas-supplying inlet 1 and a raised floor 6 formed adjacent that wall of the reaction chamber which has the gas-exhausting outlet, and that in the comparative embodiment no partition 7 to divide the reaction chamber into the upper and lower reaction chambers 8, 9 was provided. Other conditions were set same as in the second embodiment, and a soot preform for single mode optical fiber was made in the above-specified prior art apparatus. It was observed that large amounts of stray glass particles adhered and accumulated on the ceiling of the reaction chamber and some of these fell from the ceiling in masses during the manufacturing operation. The resulting porous soot preform was glassified and found to have numerous impurities and bubbles in it.

In an apparatus for manufacturing soot preform as constructed according to the present invention, the stray glass particles that did not adhere and accumulate on the target body are carried by the gas flow passing underneath the ceiling of the reaction chamber and promptly brought outside the reaction chamber. Especially, the stray glass particles and water vapor, which condenses on the wall of the upper room and makes cleaning operation difficult, are effectively prevented from entering the upper room, and thus cleaning operation after the manufacturing operation becomes considerably easier.

Also, since the adhesion and accumulation of the stray glass particles on the soot preform are restricted, it becomes possible to manufacture soot preforms of higher quality with high dependability. Furthermore, since the flame of the core deposition burner is not disturbed by the circulatory flow in the reaction chamber or the strong and occasional downward gusts along the walls of the reaction chamber, it is possible to obtain a glass preform in which the refraction index distribution is uniform along its length.

Moreover, through the use of a manufacturing apparatus of the present invention, it is also possible to obtain soot preforms for producing high quality optical fibers having dependable optical properties, such as a single-mode optical fiber having a stepped refraction index distribution, a dispersion-shifted optical fiber having a center core and a side core, and a multi-mode optical fiber having a parabolic refraction index distribution.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A method of manufacturing a soot preform for an optical fiber by depositing glass particles generated through a flame hydrolysis reaction of raw material gases onto a starting rod being rotated and pulled up, comprising:
   providing an apparatus that comprises:
      a reaction chamber for depositing said glass particles over the starting rod;
      an upper room located on top of said reaction chamber, for housing the soot preform being pulled up;
      at least one core deposition burner disposed in the reaction chamber;
      a horizontally extending slit made in an upper portion of a sidewall of the reaction chamber which is closest to said core deposition burner, at a location slightly underneath a ceiling of said reaction chamber; and
      a gas exit made in a wall of the reaction chamber which is opposed to the wall having said slit;
   disposing the starting rod in said reaction chamber;
   passing the gases into said reaction chamber through said slit;
   operating the burner to deposit said glass particles over the starting rod; and
   pulling up the starting rod deposited with said glass particles,
   wherein a velocity of the gases passing through said slit is set between 3 m/sec and 20 m/sec.

2. A method of claim 1, wherein passing of a gas through said slit is caused by forced exhaustion of gas through said gas exit, and the gas passed through said slit is a prepared gas.

3. The method of claim 2, wherein said prepared gas is an atmospheric air passed through a dust-tight filter.

4. The method of claim 2, wherein said prepared gas is air in a clean room of class 10000 or better.

5. A method of manufacturing a soot preform for an optical fiber by depositing glass particles generated through a flame hydrolysis reaction of raw material gases onto a starting rod being rotated and pulled up, comprising:
   providing an apparatus that comprises:
      a reaction chamber for depositing said glass particles over the starting rod;
      a substantially cylindrical upper room located on top of said reaction chamber, for housing the soot preform being pulled up;
      at least one core deposition burner disposed in the reaction chamber;
      a horizontally extending slit made in an upper portion of a sidewall of the reaction chamber which is closest to said core deposition burner, at a location slightly underneath a ceiling of said reaction chamber; and a gas exit made in a wall of the reaction chamber which is opposed to the wall having said slit;
disposing the starting rod in said reaction chamber;
passing the gases into said reaction chamber through said slit;
operating the burner to deposit said glass particles over the starting rod; and
pulling up the starting rod deposited with said glass particles,
wherein a downward gas flow is maintained to flow from an upper part of said upper room toward the reaction chamber at a velocity of 0.05 m/sec or greater.

* * * * *